Patented Sept. 20, 1932

1,878,766

UNITED STATES PATENT OFFICE

GILBERT F. FITZGERALD, OF MILWAUKEE, WISCONSIN

SUPPOSITORY FOR TREATING VAGINAL CONDITIONS

No Drawing.   Application filed November 26, 1928. Serial No. 322,085.

Heretofore, the most common form of treating vaginal conditions has been by medium of a douche, which entails considerable inconvenience and discomfort to the patient and this invention has as an object the provision of an improved method of treating such conditions by the insertion of a suppository having the characteristic of effervescing upon coming in contact with the vaginal secretions.

Another object of this invention resides in the provision of an improved suppository adapted for application into the vagina and which becomes effervescent upon contact with the vaginal secretions, whereby the medicinal ingredients of the suppository are thoroughly directed over the vaginal wall.

A further object of this invention resides in the improved method of treating vaginal conditions by effervescence.

The suppository is preferably molded or otherwise formed into the desired shape, one being approximately elongated and oval to facilitate its insertion into the vagina and contains menthol, eucalyptol, boric acid and acacia, or other medicinal compounds together with a granulating effervescent base, such as sodium bicarbonate and citric acid, mild silver protein and rose geranium or silver nitrate and safrol may be added to the above referred to ingredients.

The following two formulas have been found to give excellent results:

Formula No. 1, for each 35 grain suppository:

| | Grains |
|---|---|
| Mild silver protein | 1 |
| Menthol Y | 1/20 |
| Eucalyptol | 1/20 |
| Rose geranium | 1/10 |
| Sodium bicarbonate | 17 |
| Citric acid | 9 |
| Boric acid | 7 |
| Acacia | 1 |

Formula No. 2, for each 30 grain suppository:

| | Grains |
|---|---|
| Silver nitrate | 1/100 |
| Menthol Y | 1/10 |
| Eucalyptol | 1/20 |
| Safrol | 1/20 |
| Sodium bicarbonate | 11 |
| Citric acid | 7 |
| Boric acid | 9 |
| Acacia | 3 |

The above ingredients are mixed dry and pressed into the desired shape and, upon insertion in the vagina, the vaginal secretions cause the effervescent base thereof, consisting of citric acid and sodium bicarbonate, to effervesce, throwing the medicinal ingredients of the suppository into contact with the entire vagina wall insuring a thorough treatment.

While but two specific combinations of ingredients have been described, it is to be understood that they may be varied and that various medicinal ingredients may be added as conditions may require and that the effervescent characteristic of the suppository insures the thorough treatment of the vagina.

I claim:

1. A suppository for the treatment of vaginal conditions comprising a solid homogeneous mass of dry comminuted uniformly mixed ingredients, including a medicinal agent, sodium bicarbonate, and a weak non-irritating acid whereby the suppository becomes effervescent to disseminate the medicinal agent throughout the vagina immediately upon contact with the secretions thereof.

2. A suppository of the character described comprising a solid homogeneous mass of dry comminuted uniformly mixed ingredients, including silver protein, a granulated effervescent agent comprising sodium bicarbonate, and citric acid, whereby the suppository becomes effervescent immediately upon exposure to moisture.

3. A suppository of the character described comprising a solid homogeneous mass of dry comminuted ingredients of uniform texture throughout and including menthol, sodium bicarbonate, and citric acid.

In testimony whereof I have hereunto affixed my signature.

GILBERT F. FITZGERALD.